V. N. PERRY.
WHEEL CHOCK.
APPLICATION FILED SEPT. 2, 1919.

1,326,688.

Patented Dec. 30, 1919.

INVENTOR.
Victor N. Perry,
By Parker & Brockwood.
ATTORNEYS.

UNITED STATES PATENT OFFICE.

VICTOR N. PERRY, OF BUFFALO, NEW YORK.

WHEEL-CHOCK.

1,326,688.  Specification of Letters Patent.  Patented Dec. 30, 1919.

Application filed September 2, 1919. Serial No. 320,968.

*To all whom it may concern:*

Be it known that I, VICTOR N. PERRY, a citizen of the United States, residing at Buffalo, in the county of Erie and State of New York, have invented a new and useful Improvement in Wheel-Chocks, of which the following is a specification.

This invention relates to retarding attachments for use on the wheels of motor cars and other vehicles for the purpose of preventing or indicating the theft of the vehicle. The device has a part adapted to engage the road or pavement to give warning to the public that the vehicle is being stolen and the device may also be used as a traction device when applied to a drive wheel of a motor vehicle to assist in extricating the vehicle from a mud hole, or from a sandy or other soft place.

In some retarding devices of this sort now in use a single, outwardly projecting spur is provided, the body of the device embracing and conforming substantially to the cross-section of the rim and tire; some other devices embrace the rim and tire and have a part which surrounds and is locked to a spoke of the wheel. Devices of this sort, however, are not always reliable as, in the first case by deflating the tire the device may be turned laterally so that the spur will not engage the road and in the second case the spoke could be cut and the device turned or removed. The purpose of these devices may therefore be defeated.

One object of this invention is to improve retarding devices of this sort so that they may serve their intended purpose regardless of their position when encircling the rim and tire of a wheel; also to construct the device so that it may be advantageously used as a traction device under certain conditions; also to improve the construction of devices of this kind in other respects hereinafter specified.

Figure 1:
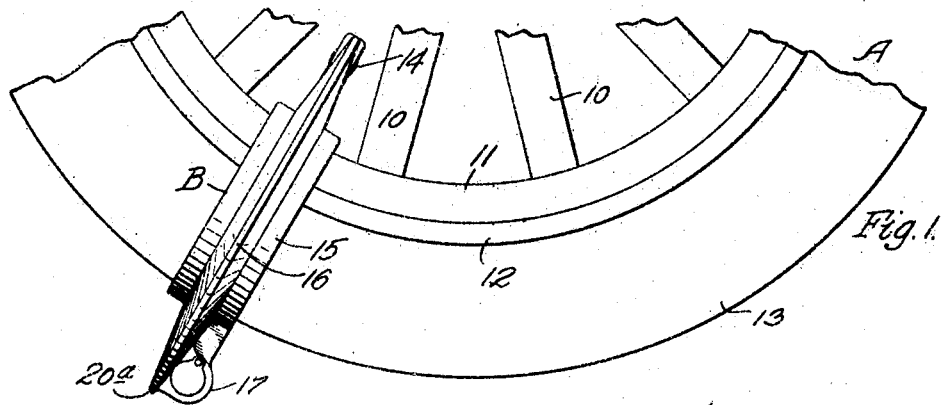
Figure 1 is a fragmentary side elevation of a vehicle wheel provided with a wheel attachment embodying the invention.

The wheel attachment shown in the accompanying drawings is attached to a wheel A of a motor vehicle comprising the usual spokes 10, felly 11, rim 12 and tire 13, which may be of any suitable form.

The wheel attachment shown in the drawings and embodying the invention comprise two parts adapted to be locked to each other and having an inner sleeve or flange adapted to extend around and engage the tire, felly and rim of a wheel, and a web or flange which extends outwardly from the inner sleeve and forms a projection or chock which to a certain extent resists the turning of the wheel.

Figure 2:
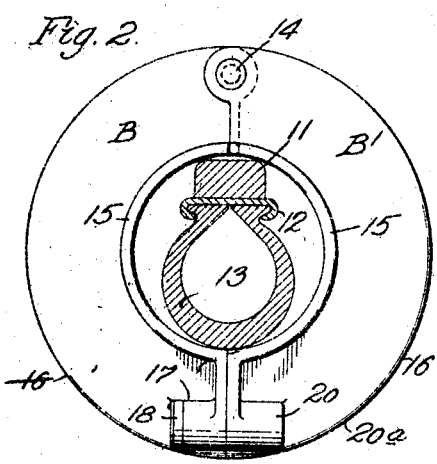
Fig. 2 is a transverse sectional view of a tire, and showing a face view of the wheel attachment secured thereon.

The wheel attachment shown in Figs. 1 to 4 is formed of two members or parts B B', which, in the construction shown, are substantially semi-annular and which are hinged together at one end by a pivot or pin 14. Each member comprises a substantially semi-cylindrical sleeve portion 15 and an outwardly extending, relatively wide, semi-annular web 16, the sleeve portion preferably being wider than the web 16 to form an extended bearing surface on the tire and rim in any position in which the device may be placed on the tire and rim. The member B is provided at the end opposite to the pivot 14 with a boss or projection 17 which is adapted to be locked or secured in any suitable manner to the corresponding adjacent end of the member B' to retain the attachment on the wheel A. The means shown in the drawings comprise a cylinder lock 18 arranged in the boss 17 and having a part 19 provided with a bolt which is adapted to enter a boss or socket 20 in the member B', to lock the members B B' together. When the attachment is secured on the wheel A, as shown in Fig. 2, the webs 16 form a wide annular flange having a continuous retarding edge 20ª, so that the device will function properly regardless of the position thereof on the wheel. In other words, the device is free to turn or roll on its axis and it will at all times have an outwardly projecting portion which will resist movement of the vehicle and effectually indicate that the vehicle if moving, is being unlawfully used. If desired, a suitable notice or sign may be printed or displayed on the opposite faces of the webs 16 for informing the public that the vehicle, if in use with the device on one of its wheels, is stolen. The circular, concentric edge 20ª together with the cylindrical sleeve parts 15, make the driving of a vehicle, with the device attached, very unsafe, as a device having these features not only causes a jarring of the vehicle each time the attachment strikes the road, but will also cause the vehicle to roll or skid sidewise if driven fast and its purpose of retarding the vehicle is therefore increased.

Figure 3:
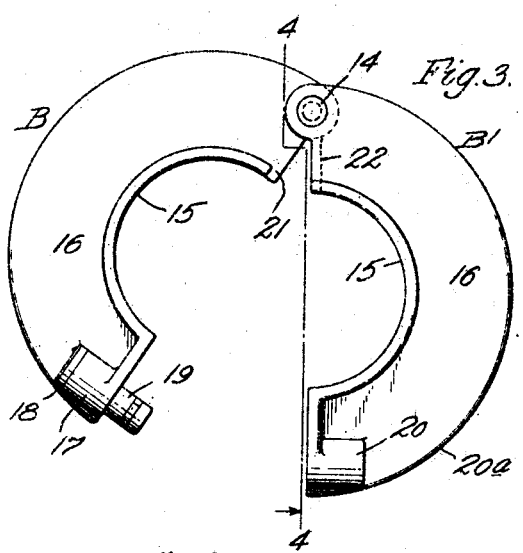
Fig. 3 is a face view thereof, disconnected from the wheel, and shown partly open.
Figure 4:
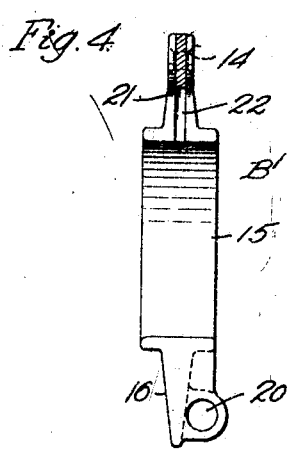
Fig. 4 is a sectional elevation thereof on line 4—4, Fig. 3.

If desired, the pivoted ends of the members B B' may be provided with a coöperating tongue 21 and groove 22, as shown in Fig. 3 to prevent the insertion of a tool in an attempt to pry the members apart or break the pivot joint.

Figure 5:
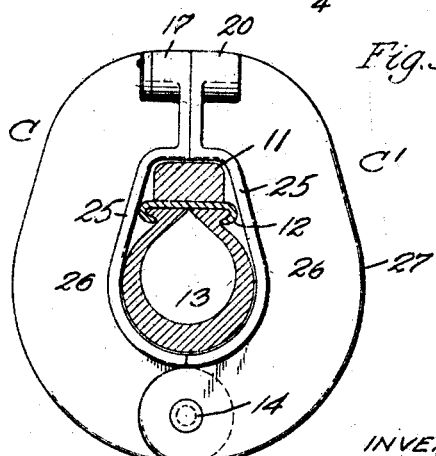
Fig. 5 is a face view of a slightly modified form of retarding device, applied to a wheel.

In Fig. 5 is shown a slightly modified form of retarding device, which instead of having a cylindrical sleeve portion, is provided with members C C', having sleeve parts 25 which substantially conform to the cross section of the felly 11, rim 12 and tire 13. Webs 26 of uniform width, as in the members B B', form a retarding edge 27. This modified form of device is not adapted in its normal use to rotate relatively to the wheel, but nevertheless will prevent or indicate the theft of a vehicle even if the tire is deflated and the device turned around, as some portion of the edge 27 would always engage the roadway and retard the vehicle.

Another feature of either form of the device shown in the drawings is that it may be used as a traction device or cleat for the drive wheel or wheels of a motor vehicle.

If a drive wheel becomes embedded in a mud hole or sandy spot and rotates without being able to obtain proper tractive contact, the device may be applied to a driving wheel and the broad, transversely disposed web or flange will dig into the mud or sand and give sufficient traction to extricate the vehicle.

The described construction provides a very strong and simple retarding device which will properly serve its intended purpose at all times and which cannot readily be broken or removed. Moreover, the ability to use it as a traction device under certain conditions adds to its usefulness.

I claim as my invention:

1. In an attachment for vehicle wheels, the combination of two members adapted to be locked together to embrace the tire and rim of a wheel, said members having outwardly extending portions which, when the members are locked together, form a substantially continuous transverse projecting flange around the tire and rim.

2. In an attachment for vehicle wheels, the combination of two members adapted to be locked together to embrace the tire and rim of a wheel, said members having inner flanges adapted to engage the tire and rim of the wheel and retarding flanges extending outwardly from said inner flanges, said retarding flanges, when the members are locked together forming a substantially continuous flange extending transversely around the tire and rim.

3. In an attachment for vehicle wheels, the combination of two members each having one end pivotally connected to an end of the other member, said members being formed to extend transversely around a tire and rim, means for locking the other ends together to secure the attachment on a wheel, each of said two members having a flange extending transversely of the tire and rim and adapted to form an extended bearing surface therewith, and a flange projecting laterally from said transverse flange and extending substantially around said tire and rim.

4. In an attachment for vehicle wheels, the combination of two members pivoted together at one end and adapted to extend transversely around the tire and rim of a wheel, means for locking said members together on said wheel, and said members having means forming a continuous retarding edge entirely surrounding the tire and rim of said wheel.

5. In an attachment for vehicle wheels, the combination of two members pivoted together at one end and adapted to extend transversely around the tire and rim of a wheel, means for locking said members together on said wheel, and said members having means forming a web of substantially uniform width extending transversely around the tire and rim of said wheel and forming a continuous retarding edge.

6. In an attachment for vehicle wheels, the combination of two members pivoted together at one end and adapted to extend transversely around the tire and rim of a wheel, means for locking said members together on said wheel, each of said members having longitudinal sleeve parts and transverse webs, which when said members are locked together, respectively form a longitudinal continuous sleeve embracing said tire and rim, said transverse ribs forming a transverse continuous retarding edge, extending completely around the tire and rim of said wheel.

7. In an attachment for vehicle wheels, the combination of two members each having one end pivotally connected to and interlocking with an end of the other member, and adapted to extend transversely around the tire and rim of a wheel, means for locking the other ends of said members together on said wheel and said members having a substantially continuous retarding part which entirely surrounds the tire and rim of said wheel.

8. In an attachment for vehicle wheels, the combination of two members each having one end pivotally connected to an end of the other member, one of said ends having parts which overlap the end of the other member to form a closed joint, said members being adapted to extend transversely around the tire and rim of a wheel, means for locking the other ends of said members together on said wheel, and said members having a substantially continuous retarding part which entirely surrounds the tire and rim of said wheel.

Witness my hand this 27th day of August, 1919.

VICTOR N. PERRY.

Witnesses:
SIMON F. HURLEY,
VICTOR H. CAUBAM.